United States Patent
Fujita et al.

(10) Patent No.: US 6,681,155 B1
(45) Date of Patent: Jan. 20, 2004

(54) OPTIMIZING CONTROL METHOD AND OPTIMIZING CONTROL SYSTEM FOR POWER PLANT

(75) Inventors: Kaoru Fujita, Okayama (JP); Genichi Emoto, Okayama (JP); Seiji Nakagawa, Okayama (JP); Toshihiko Takeshita, Okayama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/763,861

(22) PCT Filed: Aug. 31, 1999

(86) PCT No.: PCT/JP99/04703
§ 371 (c)(1),
(2), (4) Date: Apr. 20, 2001

(30) Foreign Application Priority Data

Aug. 31, 1998 (JP) .......................... 10-259100
Aug. 31, 1998 (JP) .......................... 10-259102
Sep. 18, 1998 (JP) .......................... 10-282089

(51) Int. Cl.$^7$ .......................................... G05D 11/00
(52) U.S. Cl. ........................ 700/287; 700/29; 60/660
(58) Field of Search .................... 700/28, 29, 287, 700/291; 290/52; 60/660, 667, 676; 705/412

(56) References Cited

U.S. PATENT DOCUMENTS

| | | | | |
|---|---|---|---|---|
| 4,745,758 A | * | 5/1988 | Putman et al. | 60/676 |
| 4,888,953 A | * | 12/1989 | Fukayama et al. | 60/657 |
| 5,347,466 A | * | 9/1994 | Nichols et al. | 703/18 |
| 5,517,424 A | * | 5/1996 | Marcelle et al. | 700/287 |
| 5,873,251 A | * | 2/1999 | Iino | 60/660 |
| 5,886,895 A | * | 3/1999 | Kita et al. | 700/28 |
| 6,021,402 A | * | 2/2000 | Takriti | 705/412 |

FOREIGN PATENT DOCUMENTS

| | | |
|---|---|---|
| JP | 60-87633 | 5/1985 |
| JP | 1-310111 | 12/1989 |
| JP | 5-65807 | 3/1993 |

OTHER PUBLICATIONS

Translation of Minoru, Japan Patent 09–179604, "System and method for controlling operation of plant" Published Jul. 11, 1997, Filed Sep. 13, 1996.*

Translated abstract of Haruhisa, Japan Patent 02–049904, "Turbine Control Device" Published Feb. 20, 1990, Filed Aug. 10, 1988.*

* cited by examiner

*Primary Examiner*—Leo Picard
*Assistant Examiner*—Alexander Kosowski
(74) *Attorney, Agent, or Firm*—Oblon, Spivak, McClelland, Maier & Neustadt, P.C.

(57) ABSTRACT

In a power plant including a plurality of parallel-operated generating elements supplying electricity and steam, boilers and turbines are controlled in an optimum condition depending on the successive changes of the demand for steam and electricity by: estimating parameters of characteristics and state of the generating elements, which cannot be directly measured, among parameters of the generating elements needed for calculation of the optimum load distribution for each of the generating elements, based on a physical model of each of the generating elements and an input process state quantity; and controlling each of the generating elements by determining an optimum load distribution for the each of the generating elements while using the estimated parameters of the each of the generating elements, to minimize a total cost of the power plant depending on the successive changes of the demand for steam and electricity.

11 Claims, 9 Drawing Sheets

OPTIMIZING CONTROL METHOD AND OPTIMIZING CONTROL SYSTEM FOR POWER PLANT

TECHNICAL FIELD

The present invention relates to an optimizing control method and an optimizing control system for efficiently controlling a power plant which supplies energy such as electricity and steam to a factory or the like. The present invention particularly provides effective means for optimizing the load distribution between a plurality of boilers or turbines operated in parallel in a power plant.

The present invention also provides an optimum operation control method and an optimum operation control system for efficient control of the abovementioned power plant in view of scheduling factors such as seasonal fluctuations in the demands for electricity and steam, a unit electricity price and a unit fuel price, and at the minimum cost for a prescribed period.

BACKGROUND ART

FIG. 9 shows an example of a power plant employed for example in a petrochemical factory. The plant includes boilers 1, 2 using heavy oil or fuel gas as a fuel, turbines 3, 4 to generate steam and electricity, a condensing turbine 5 dedicated to power generation, generators 6, 7, 8 to convert energy into electricity, a boiler main steam base pipe 20, a steam base pipe 21 to supply steam and electricity to a factory 23, and an electric bus 22.

PID control devices are provided in a part of the power plant. More specifically, there are provided a PID control device 13 to control the boiler main steam pressure, a PID control device 14 to control the fuel flow rate of the boiler 2, a PID control device 15 to control the steam pressure, a PID control device 16 to control the steam flow rate of the turbine 4, and a PID control device 17 to control the amount of power generated by the generator 8, so that supply of energy is balanced with the demand. It is to be noted that only some of the PID control devices for boilers and turbines are shown for ease of illustration.

The load distribution among the boilers is achieved by the operator manually adjusting the value set at the PID control device 14 which controls the fuel flow rate, while the load distribution among turbines is achieved by manually adjusting the value set at the PID control device 16 which controls the steam flow rate. The amount of electricity to receive from an electric power company is controlled by manually adjusting the value set at the PID control device 17 which controls the amount of energy generation.

At the time of such manual adjustment, there has been an attempt to provide the operator with an optimum operation guideline in view of the economical efficiency of the plant as a whole (see for example "Steam Balance Optimization in Chemical Plant.," Proceedings of IFAC Symposium ADCHEM '94 (1994)). In this attempt, the optimum calculation is executed based on a linear model of the plant, and the operation adjustment based on the result is left in the hands of the operator.

It is known that the scheduling problem to obtain a yearly or monthly optimum operation pattern for a power plant is solved by a heuristic method or mathematical programming. However, the result can hardly be reflected on-line upon an actual plant, and the operation adjustment is again put in the hands of the operator.

Meanwhile, the following three problems are encountered in the above control system.

Firstly, it is much mentally distressing for the operator to consider the economical efficiency of a power plant as a whole and frequently adjust the boilers and turbines according to constantly changing supply and demand of steam and electricity to make sure that the boilers and turbines operate in an optimum state. This is quite difficult and the operation necessarily fails to satisfy the optimum operation condition.

Secondly, the model to evaluate the economical efficiency of a power plant as a whole is a linear model based on past record data, and therefore does not take into account the non-linearity of the plant. The model could therefore depart from the real optimum operation condition when the operation condition changes.

Thirdly, the boilers 1,2 and the turbines 3, 4, 5 are closely related with each other through the boiler main steam base pipe 20, and the steam base pipe 21, and the generators 6, 7 and 8 depend on the turbines 3, 4 and 5, respectively. The amount of electricity to receive and the amount of electricity to generate are related through the electric bus. Therefore, the control systems in the power plant interfere with each other and fluctuations in the supply and demand balance of electricity and steam in the plant as a whole can hardly be absorbed in a short period of time.

DISCLOSURE OF THE INVENTION

Figure 1:
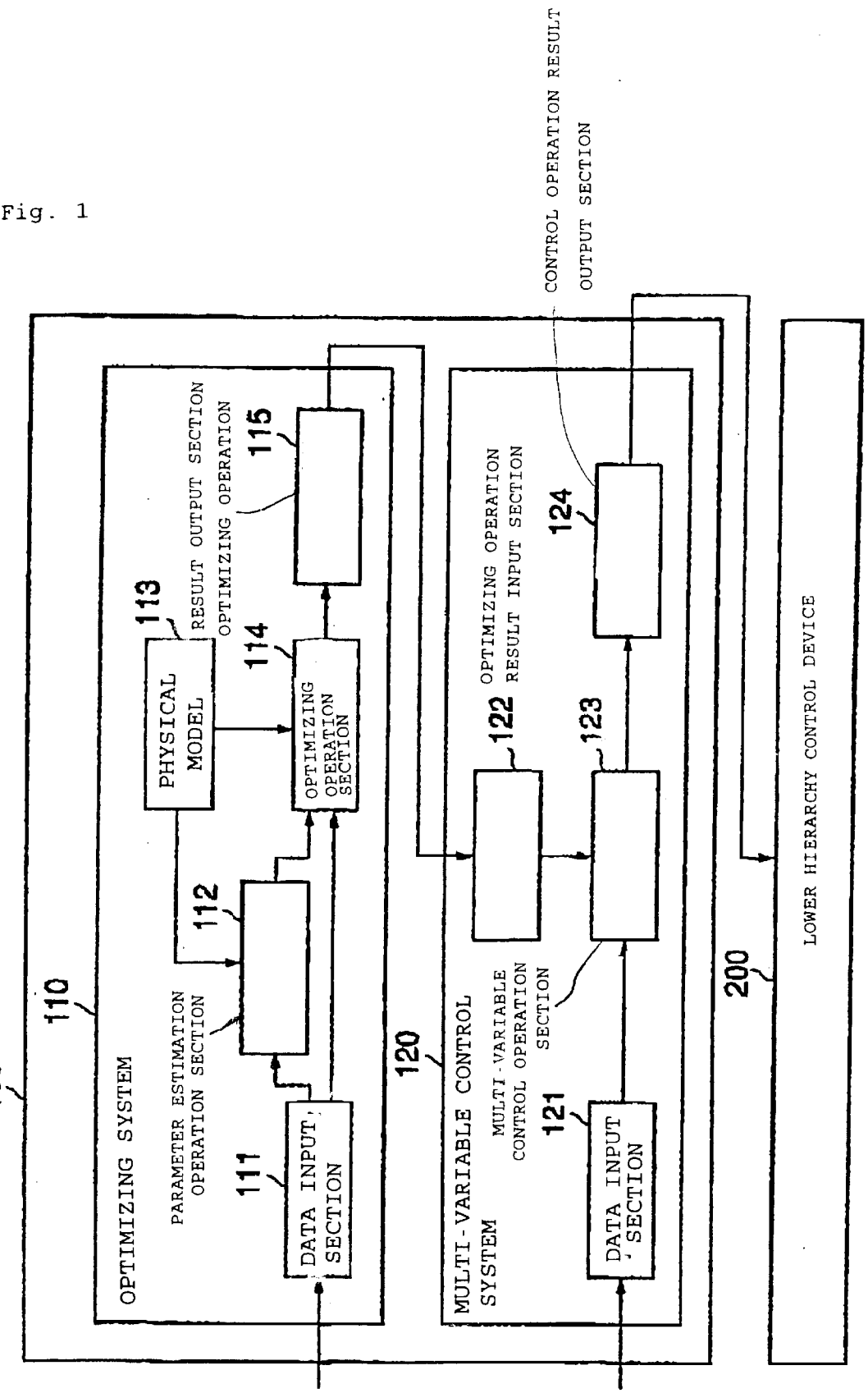
FIG. 1 is a block diagram of an optimizing control system according to an embodiment of the present invention.

In order to solve the above described problems, in a power plant including a plurality of generating elements such as boilers and turbines operated in parallel, the present invention automatically operates and controls the optimum load distribution for each of the plurality of generating elements. In this case, in the optimum load distribution operation, parameters related to the characteristic or state of each generation element which cannot directly be measured from the plant, e.g. parameters such as a loss parameter in a turbine generator or a fouling factor of a heat exchanger are necessary. According to the present invention, those parameters which cannot directly be measured are estimated by an operation based on a physical model of each generation element and an input process state quantity, and using the obtained parameters of each generating element, the optimum load distribution among the generating elements to minimize the cost of the power plant as a whole is determined. The determined optimum load distribution and the input process state quantity are used for multi-variable model predictive control, so that the generating elements are controlled in an optimum manner.

Also according to the present invention, cost scheduling factors such as seasonal fluctuations in the demand for electricity and steam, constraints on the yearly or monthly amount of purchase based on purchase contract conditions, fluctuations in the unit electricity price or the unit fuel price and past record purchase values for electricity and steam are input as schedule control data. The schedule control data and the model of the power plant are used for operating an optimum schedule to minimize the operation cost of the power plant as a whole for a prescribed period. The schedule obtained as the result of operation is used as a constraint condition in the optimum load distribution operation for the generating elements of the power plant, so that the generating elements can be controlled in an optimum manner in view of an economically optimum operation schedule for the power plant as a whole for a specified period such as a year or month. In this case, the past record purchase values of electricity and steam are normally taken as a process state quantity, while the values are also input as schedule control data at the time of re-scheduling during a prescribed period, because constraints or the like upon the yearly accumulated purchase amount must be taken into account relative to the past record purchase values.

By the optimum load distribution operation in view of the schedule, an optimum load distribution for a plurality of generating elements such as boilers and turbines in a power plant is automatically calculated depending upon an input process state quantity based on constraint conditions given by the schedule at the time point. Then, based on the calculated optimum load distribution, a necessary amount of control to each generating element depending upon the input process state quantity is calculated by a multi-variable control operation and each generating element is controlled accordingly.

Best Modes for Carrying Out the Invention

An embodiment of the present invention will be described below with reference to the accompanying drawings.

FIG. 1 is a diagram of the structure of an optimizing control system according to one embodiment of the present invention. In FIG. 1, the optimizing control system 100 includes an optimizing system 110 and a multi-variable control system 120, which are roughly categorized from a functional point of view.

The optimizing system 110 includes a data input section 111, a parameter estimation operation section 112, a physical model 113, an optimizing operation section 114, and an optimizing operation result output section 115.

The multi-variable control system 120 includes a data input section 121, an optimizing operation result input section 122, a multiple-variable control operation section 123, and a control operation result output section 124.

The data input section 111 is used to input in real time state quantities in the power plant such as the temperature, pressure, and flow rate of each power plant component, e.g. the steam flow rate, temperature, pressure and generation amount of each turbine, the feed water flow rate, temperature and pressure of each boiler, and the fuel flow rate, temperature and pressure of each boiler. The input state quantities are supplied to the parameter estimation operation section 112 and the optimizing operation section 114.

The parameter estimation operation section 112 estimates parameters of the physical model 113 of the power plant which vary as the operation condition changes, and the estimated parameters are supplied to the optimizing operation section 114.

The physical model 113 is a model composed of components in the power plant such as a turbine steam control valve, stages of turbines, boilers and a feed water preheating system for the boilers, and material balance and heat balance formulas between the components. The model represents relational expressions to be satisfied between the values of process state quantities such as plant measurement data e.g. the temperature, pressure and flow rate in each component in the power plant, and inherently includes constraint conditions such as the upper and lower limits of the process state quantity values. The model is used in the parameter estimation operation section 112 and the optimizing operation section 114.

The optimizing operation section 114 inherently includes data on utility costs such as the fuel cost for the boilers, electricity purchase cost, SOX related impost, boiler water and an auxiliary agent and relational expressions. The optimizing operation section 114 calculates operation conditions for each component by executing an optimizing operation to minimize the operation cost of the power plant as a whole, while satisfying relational expressions established between the process state quantities such as the temperature, pressure and flow rate of the components in the power plant set by the power plant model 4 and constraint conditions related to the components, based on the data supplied from the data input section 111 and the parameter estimation operation section 112 and the physical model 113 of the power plant. The result of the optimizing operation is supplied to the optimizing operation result output section 115.

The optimizing operation result output section 115 is supplied to the optimizing operation result input section 122 in the multi-variable control system 120.

The data input section 121 is used to input state quantities in the power plant in real time and the input state quantities are supplied to the multi-variable control operation section 123.

The optimizing operation result input section 122 receives data from the optimizing operation result output section 115 and supplies the received data to the multi-variable control operation section 123.

The multi-variable control operation section 123 uses data obtained from the data input section 121 and the optimizing operation result input section 122 for a multi-variable control operation, and supplies the operation result to the control operation result output section 124.

The control operation result output section 124 supplies a control operation result to a lower hierarchy control device 200.

Figure 2:
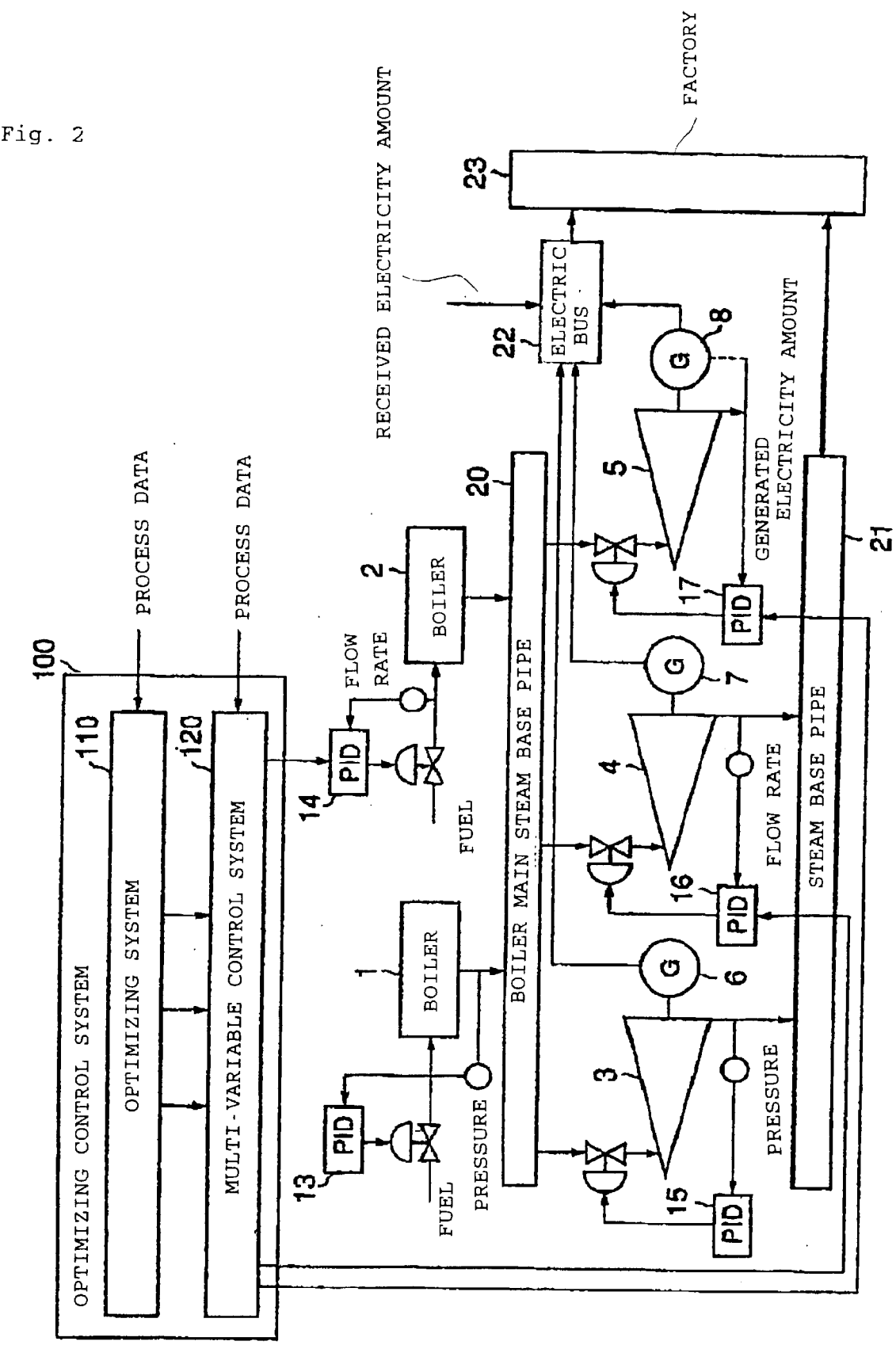
FIG. 2 is a system block diagram of an optimizing control system according to an embodiment of the present invention applied to a power plant.
Figure 9:
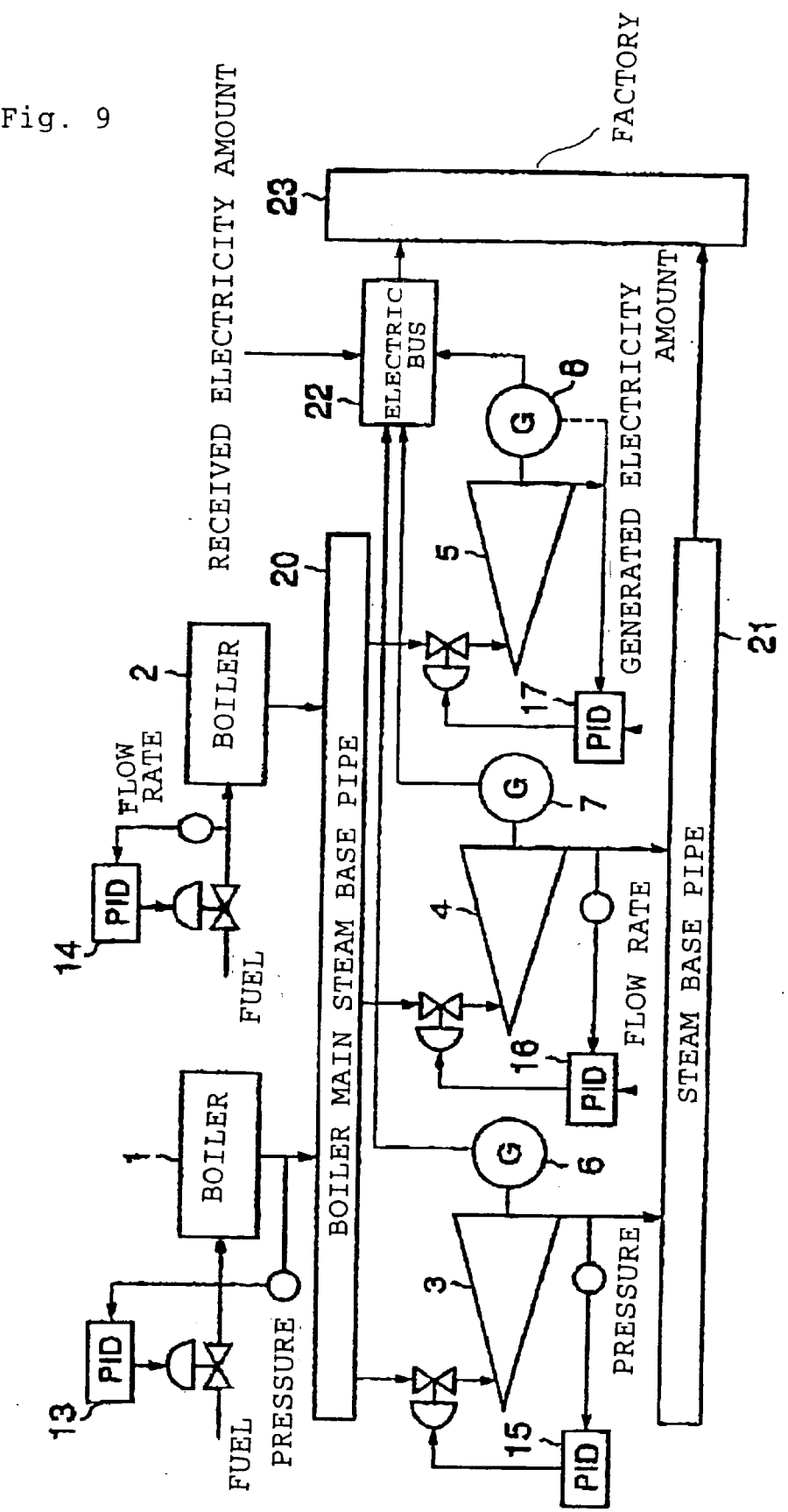
FIG. 9 is a block diagram of an example of a general power plant.

FIG. 2 is a diagram showing an example applying the optimizing control system as shown in FIG. 1 to a power plant employed in a petrochemical factory or the like as described in FIG. 9.

This will be now described in detail with reference to FIGS. 1 and 2.

In the structure as shown in FIG. 2, in the optimizing system 110, the load distributions between the boilers 1 and 2 and between the turbines 3, 4 and 5 which satisfy the supply and demand balance of steam and electricity and are yet economically optimum for the power plant as a whole are calculated.

More specifically, in the optimizing operation section 114 in the optimizing system 110 shown in FIG. 1, an optimizing operation to minimize the operation cost of the power plant as a whole is executed according to mathematical programming based on state quantities in the power plant, parameters estimated by the parameter estimation operation section 112 and the physical model 113 of the power plant. In general, the physical model of a power plant as a whole is represented by a large scale, non-linear equation, and therefore successive quadratic programming method known to be relatively effective in solving a large scale, non-linear problem is employed. Meanwhile, other mathematical programming methods such as a generalized reduced gradient (GRG) method may be applied.

The physical model 113 of the power plant is represented by equations of material balance, thermal balance and the like related to each component such as a boiler and a turbine. For example, different models are prepared depending upon the arrangement or number of heat exchangers for a physical model of a boiler. The heat exchanger itself is represented by a general-purpose model, and the difference in capability is given in the form of a parameter. For turbines, though the model is different depending upon the number of stages of turbines, one stage is represented by a common general-purpose model. The physical models of a turbine steam control valve, each stage of turbines, and a heat exchanger in a boiler feed water preheating system will be now described by way of illustration.

Figure 4:
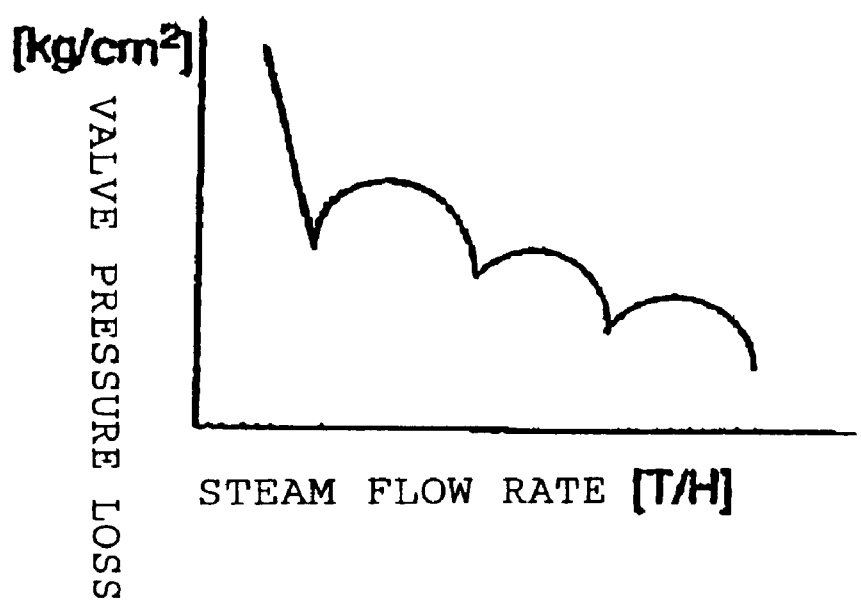
FIG. 4 is a graph showing the pressure loss characteristic curve of a turbine steam control valve.

For the turbine steam control valve, the following equations (1) to (3) can be established in consideration of the pressure loss characteristic by the amount of passed steam:

$$Pvin - fp\ (Fvin) = Pvout \tag{1}$$

$$Hvin = Hvout \tag{2}$$

$$Fvin = Fvout \tag{3}$$

where $fp\ (Fvin)$ is the pressure loss characteristic function of the turbine steam control valve shown in FIG. 4, and represents the pressure loss in the steam as it is passed through the steam control valve. Hvin and Hvout are the steam enthalpies at the steam inlet and outlet of the steam control valve. Pvin and Pvout represent the steam pressure at the inlet and outlet of the steam control valve, respectively. Fvin and Fvout represent the steam flow rates at the inlet and outlet of the steam control valve, respectively.

Physical models related to respective stages of turbines are given by the following equations (4) to (10), when steam passing through the turbine is overheated:

$$Pow = \eta * F * (Hin - Hisent) + \beta \tag{4}$$

$$\eta = f1\ (F) \tag{5}$$

$$Hisent = f2\ (Pout,\ Tisent) \tag{6}$$

$$Sin = Sout \tag{7}$$

$$Sin = f3\ (Pin,\ Tin) \tag{8}$$

$$Sout = f3\ (Pout,\ Tisent) \tag{9}$$

$$Hin = f4\ (Pin,\ Tin) \tag{10}$$

where Pow is a turbine generator output, $\eta$ is turbine efficiency, F is the flow rate of steam passed through a turbine stage, Hin is the enthalpy of the turbine stage inlet steam, Hisent is an isentropic enthalpy at the turbine stage outlet, $\beta$ is a generator loss parameter, Pin and Pout are steam pressure at the inlet and outlet of the turbine stage, Tin is the temperature of the steam at the inlet of the turbine stage, Tisent is an isentropic temperature at the outlet of the turbine stage, and Sin and Sout are entropies of the steam at the inlet and outlet of the turbine, respectively.

The turbine efficiency $\eta$ is provided by analyzing the design data of the turbine or the record data of process state quantities, and represented in the form of a non-linear function of the steam flow rate F. The enthalpies Hin and Hisent and entropies Sin, Sout are each represented in the form of a non-linear function of the temperature and pressure of steam.

The generator loss parameter $\beta$ is a parameter representing the efficiency in converting the drop in the enthalpy of steam between the inlet and outlet of the turbine into electricity. Note that f1, f2, f3 and f4 all represent a non-linear function.

For a heat exchanger for preheating boiler feed water, the following equations (11) to (15) can be defined:

$$Pinc = Poutc + \Delta Pc \tag{11}$$

$$Pinh = Pouth + \Delta Ph \tag{12}$$

$$Finc = Foutc \tag{13}$$

$$Finh = Fouth \tag{14}$$

$$Finc * Cpc * (Toutc - Tinc) = Finh * Cph * (Tinh - Touth) \tag{15}$$

where $\Delta Pc$ is the pressure loss between the feed water inlet and outlet, and $\Delta Ph$ is the pressure loss between the steam inlet and outlet. Tinc, Pinc and Finc are the temperature, pressure and flow rate, respectively at the boiler feed water inlet detected by a detector 19b. Toutc, Poutc, and Foutc are the temperature, pressure and flow rate, respectively at the boiler feed water outlet detected by a detector 19d. Tinh, Pinh and Finh are the temperature, pressure and flow rate at the steam inlet detected by a detector 19a. Touth, Pouth and Fouth are the temperature, pressure and flow rate, respectively at the steam outlet detected by a detector 19c. Cpc and Cph represent the specific heat of feed water and steam, respectively.

Equations are similarly established for other boilers and the like based on material balance and thermal balance. The coupling state between the components in the power plant such as the state in which the steam generated by the boiler comes into the turbines is also defined.

The parameter estimation operation section 112 estimates parameters based on process state quantities input in real time for each of boilers and turbines and the physical model 113. The parameter is for example the loss parameter $\beta$ of a turbine generator produced based on a process state quantity and expressed by the equation (4), or the fouling factor of an heat exchanger changing based on the operation state of the plant.

The parameters thus estimated for boilers and turbines are used for an optimizing operation at the optimizing operation section 114, and therefore the optimizing operation result reflects the process states which change in real time.

The optimizing operation result output section 115 outputs the optimum loads for boilers 1, 2 and the optimum loads for the turbines 3, 4 and 5 calculated at the optimizing operation section 114 to the multi-variable control system 120.

Meanwhile, under the control of the multi-variable control system 120, the economically optimum operation condition calculated by the optimizing system 110 based on the dynamic characteristic of the power plant is fulfilled in a short period, and fluctuations in the supply and demand balance of steam and electricity can be absorbed in a short period.

More specifically, the optimum loads for boilers 1, 2 and the optimum loads for the turbines 3, 4 and 5 input at the optimizing operation result input section 122 are input to the multi-variable control operation section 123 and set as a setting value for a control operation.

The multi-variable control operation section 123 uses process-state quantities supplied from the data input section 121 as a controlled variable, a disturbance variable, and a manipulated variable, and the optimizing operation result input at the optimizing operation result input section 122 as a setting value for a multi-variable control operation.

There is mutual interference in control of boilers, turbines and the like in a power plant, and the control is always affected by disturbance caused by fluctuations in supply and demand of electricity and steam. This is taken into account, and the multi-variable model predictive control is applied because it is excellent in changing setting values and removing disturbance in a multi-variable system with mutual interference.

The multi-variable control operation result is supplied as a setting value at the PID control devices 14, 16 and 17 of the lower hierarchy control device 200 through the multi-variable control operation result output section 124.

Figure 3:
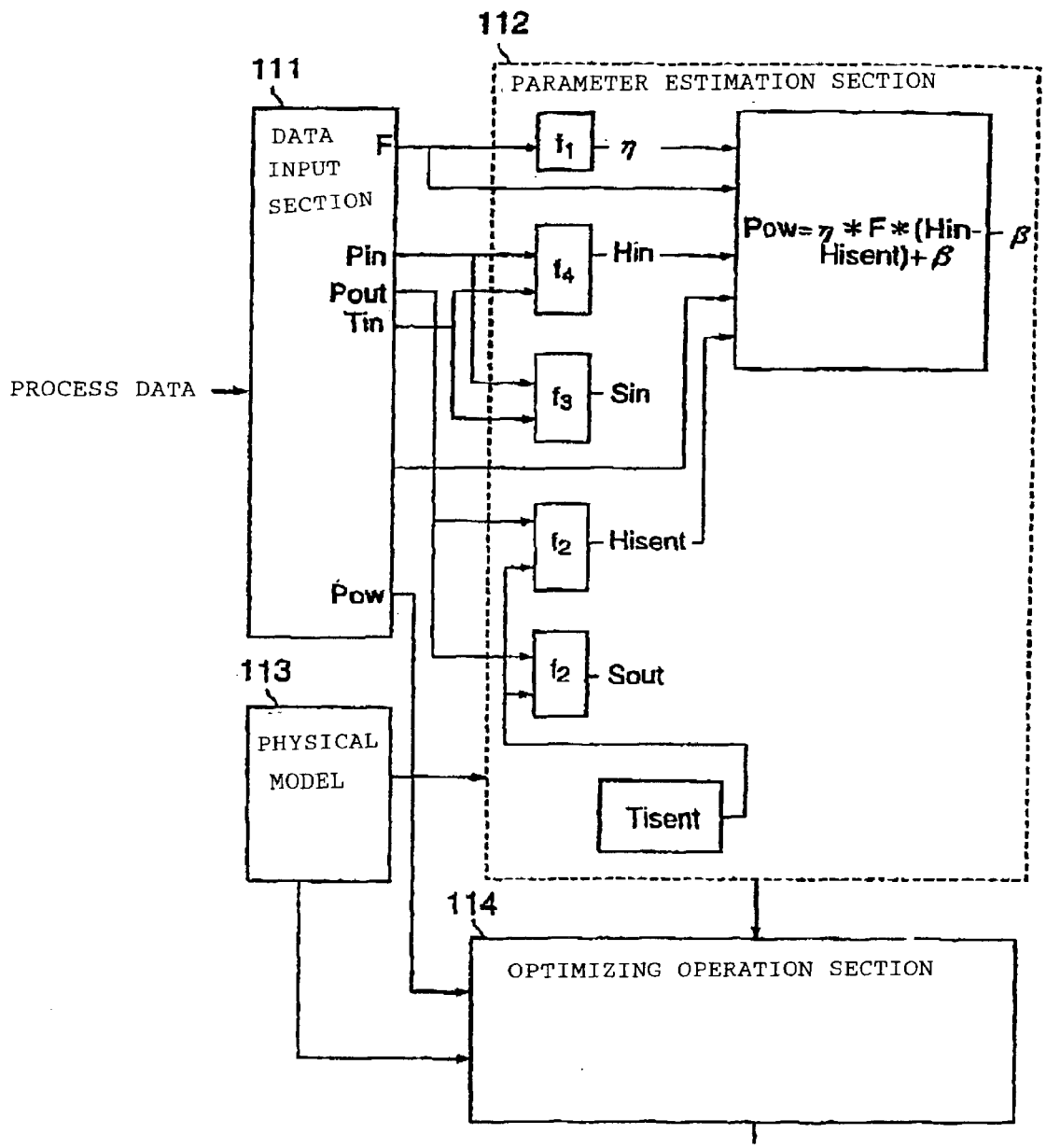
FIG. 3 is a block diagram of a schematic flow of a parameter estimation operation processing according to the present invention.

FIG. 3 is a schematic flowchart showing a parameter estimation operation processing for performing parameter estimation by using the physical model of each stage of turbines expressed by the above equations (4) to (10). In FIG. 3, the parameter estimation operation section 112 receives the equations (4) to (10) necessary for parameter estimation from the physical model 113 when the estimation of turbine parameter is performed, and pieces of process data F, Pin, Pout, Tin, Pow and the like changing in real time are input from the data input section 111.

The parameter estimation operation section 112 solves simultaneous equations including the equations (4) to (10) and the like for the input process data to determine a parameter value.

The parameter estimation operation section 112 estimates a parameter for each generation element such as a boiler and a turbine in the power plant, and outputs the estimated parameter values to the optimizing operation section 114.

The optimizing operation section 114 uses the parameter values estimated by the parameter estimation operation section 112, process data input from the data input section 111 and the physical model of the power plant input from the physical model 113 for an optimizing operation to minimize the operation cost of the power plant as a whole. In the cost calculation formulas used for the optimizing operation, the model of each element in the power plant such as boilers, turbines, a feed water preheating system and a steam distribution pipe system is expressed in the form of an equality constraint, and formulated into an optimizing problem using an evaluation function to minimize the operation cost. For some power plant, the calculation formula could be a combination of equality constraints as enormous as 12000.

Each function of the optimizing system 110 and the multi-variable control system 120 shown in FIG. 1 is implemented by a program, and can be implemented using some general purpose, commercially available packaged software. Such general-purpose packaged software may be, as the optimizing system, for example DMO available from Aspen Technology, Inc., HYSYS.RTO+ from AEA Technology, or ROMEO from Simulation Science Inc. For the multi-variable control system, for example, DMC plus available from Aspen Technology Inc., or RMPCT from Honeywell Inc. may be used.

As described above, the optimizing control system includes the optimizing system 110 and the multi-variable control system 120 according to the present invention, therefore improved controllability results and also the power plant can be optimized as a whole.

Figure 8:
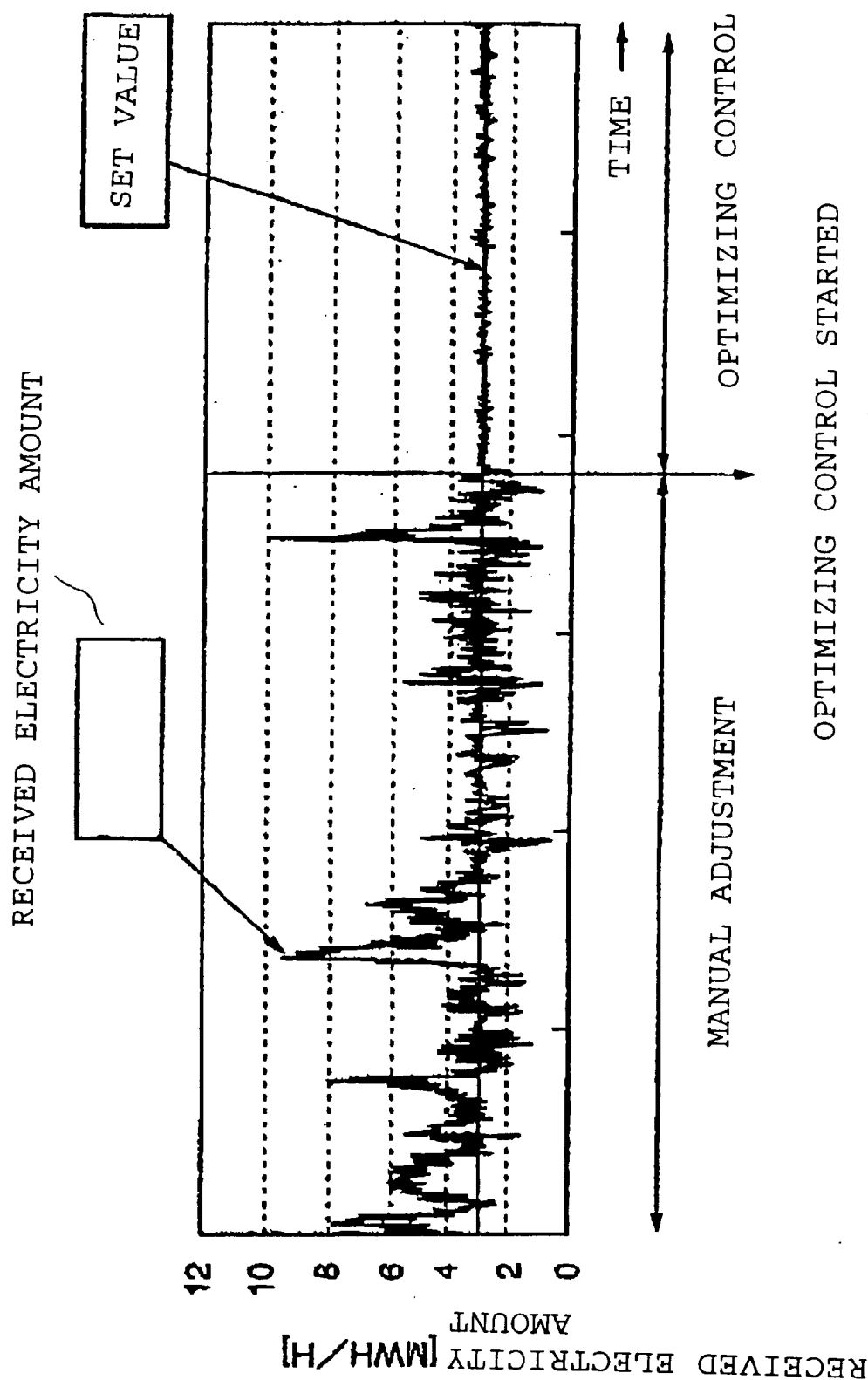
FIG. 8 is a transition graph of electricity received showing the performance of optimizing control according to the present invention.

FIG. 8 is a chart showing the transition of the amount of received electricity when the optimizing control according to the present invention is applied during conventional manual control by way of illustration. As can be seen, the controllability is significantly improved after the optimizing control is started.

An application of the present invention to the power plant shown in FIG. 2 has been described, while it is understood that the present invention is applicable to any other types of power plants.

Minimization of the operation cost for a prescribed time period will be now described by referring to another embodiment of the present invention.

Figure 5:
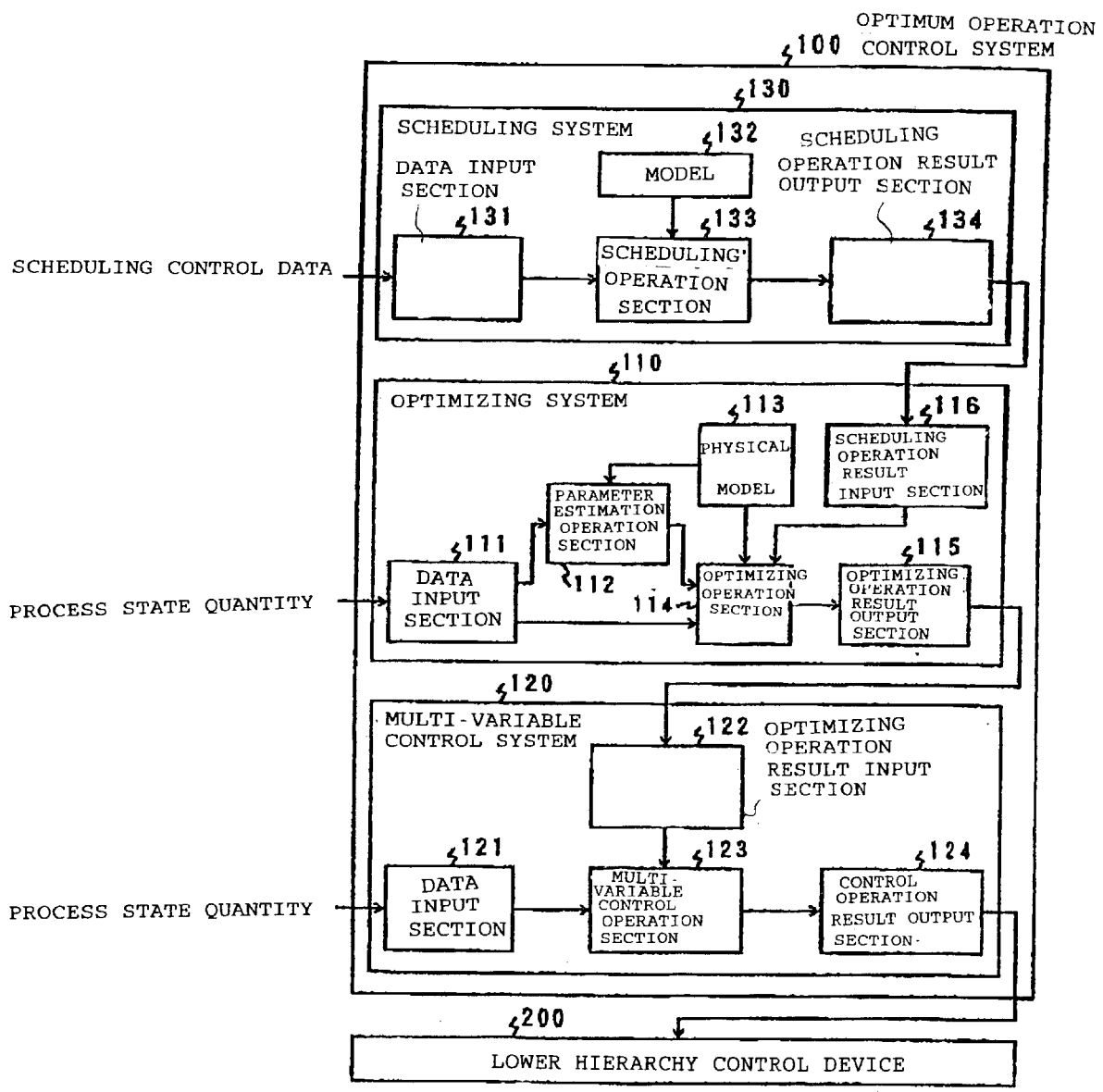
FIG. 5 is a block diagram of an optimum operation control system according to another embodiment of the present invention.

FIG. 5 is a diagram of an optimum operation control system according to another embodiment of the present invention. The device includes a scheduling system 130, an optimizing system 110, and a multi-variable control system 120 from a functional point of view.

The scheduling system 130 includes a data input section 131, a model 132, a scheduling operation section 133, and a scheduling operation result output section 134.

The optimizing system 110 includes a data input section 111, a parameter estimation operation section 112, a physical model 113, an optimizing operation section 114, an optimizing operation result output section 115, and a scheduling operation result input section 116.

The multi-variable control system 120 includes a data input section 121, an optimizing operation result input section 122, a multi-variable control operation section 123, and a control operation result output section 124.

In the scheduling system 130, the data input section 131 is used to input control data necessary for scheduling in the power plant, and the data is supplied to the scheduling operation section 133.

The model 132 is a model including boilers, turbines and the like in the power plant, and used in the scheduling operation section 133.

The scheduling operation section 133 calculates an optimum operation schedule for a period specified based on the data input section 131 and the model 132, and the result is supplied to the scheduling operation result output section 134.

The scheduling operation result output section 134 is used to supply the scheduling operation result to the scheduling operation result input section 116 in the optimizing system 110. Here, an operation condition according to real time is output so that the optimally scheduled operation condition for the specified period is used by the optimizing system 110.

The optimizing system 110 in FIG. 5 is composed similarly to the optimizing system 110 in FIG. 1 except that the scheduling operation result input section 116 is provided, and the scheduling operation result input section 116 is provided with an operation condition output from the scheduling operation result output section 134. The optimizing operation section 114 executes an optimizing operation to minimize the operation cost of the power plant as a whole based on the data supplied from the data input section 111, the parameter estimation operation section 112, and the scheduling operation result input section 116 and the physical model 113 of the power plant. The result of the optimizing operation is supplied to the optimizing operation result output section 115.

The optimizing operation result output from the optimizing operation result output section 115 is supplied to the optimizing operation result input section 122 in the multi-variable control system 120, and a multi-variable control operation is executed similarly to the multi-variable control system 120 in FIG. 1. The result of the operation is supplied to the control operation result output section 124, and to the lower hierarchy control device 200.

Figure 6:
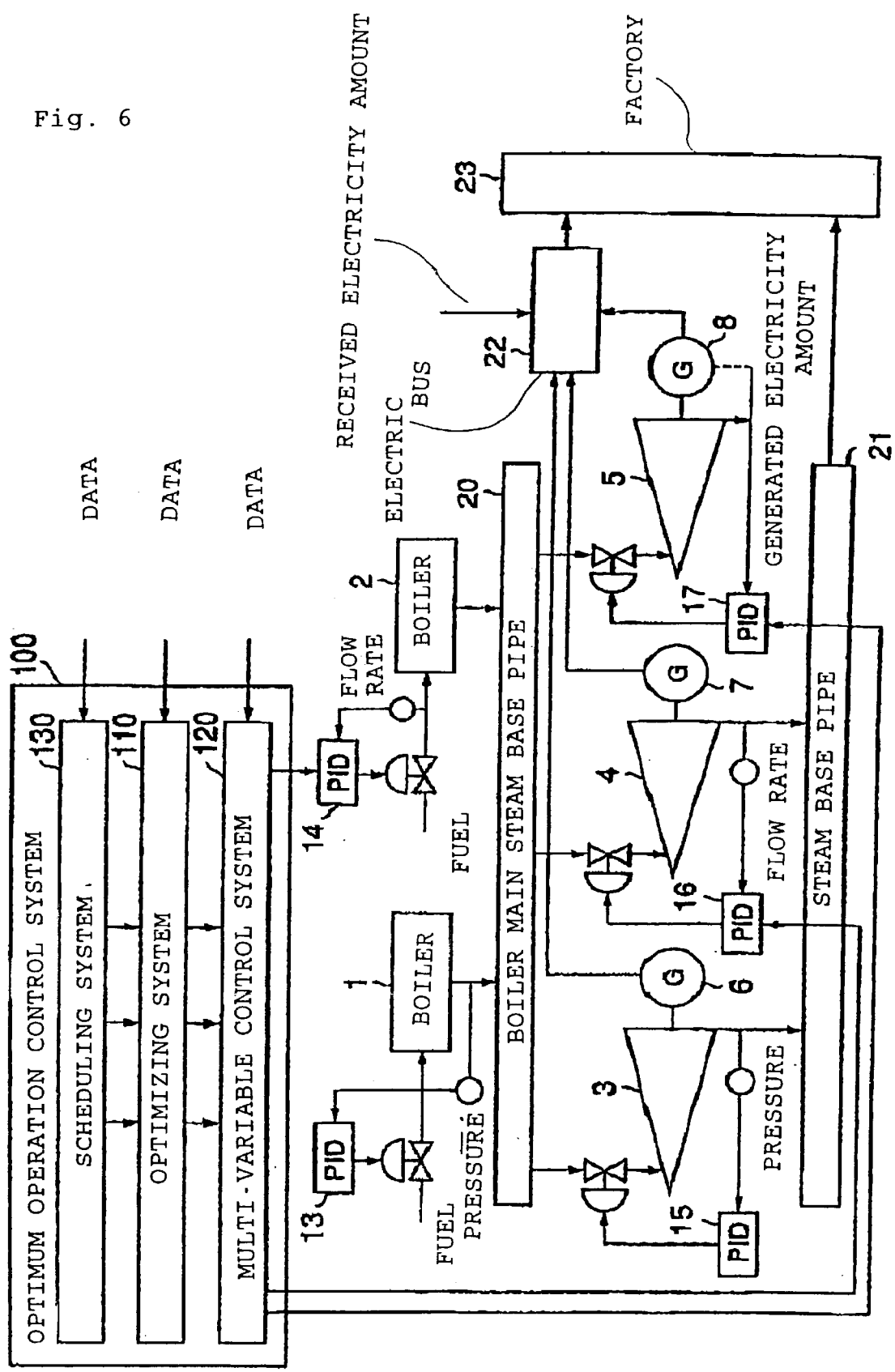
FIG. 6 is a system block diagram of an optimum operation control system according to another embodiment of the present invention applied to a power plant.

FIG. 6 is a diagram of an embodiment in the case where an optimum operation control system according to the present invention is applied to a power plant employed in the petrochemical factory as described above.

In the structure shown in FIG. 6, in the scheduling system 130, the amount of electricity to receive or the amount of fuel used for boilers are restricted for a specified period such as a year or a month depending upon the purchase contract conditions of electricity and fuel. Therefore, scheduling is performed to minimize the total operation cost of the power plant for the specified period in consideration of future demands for steam and electricity.

Figure 7:
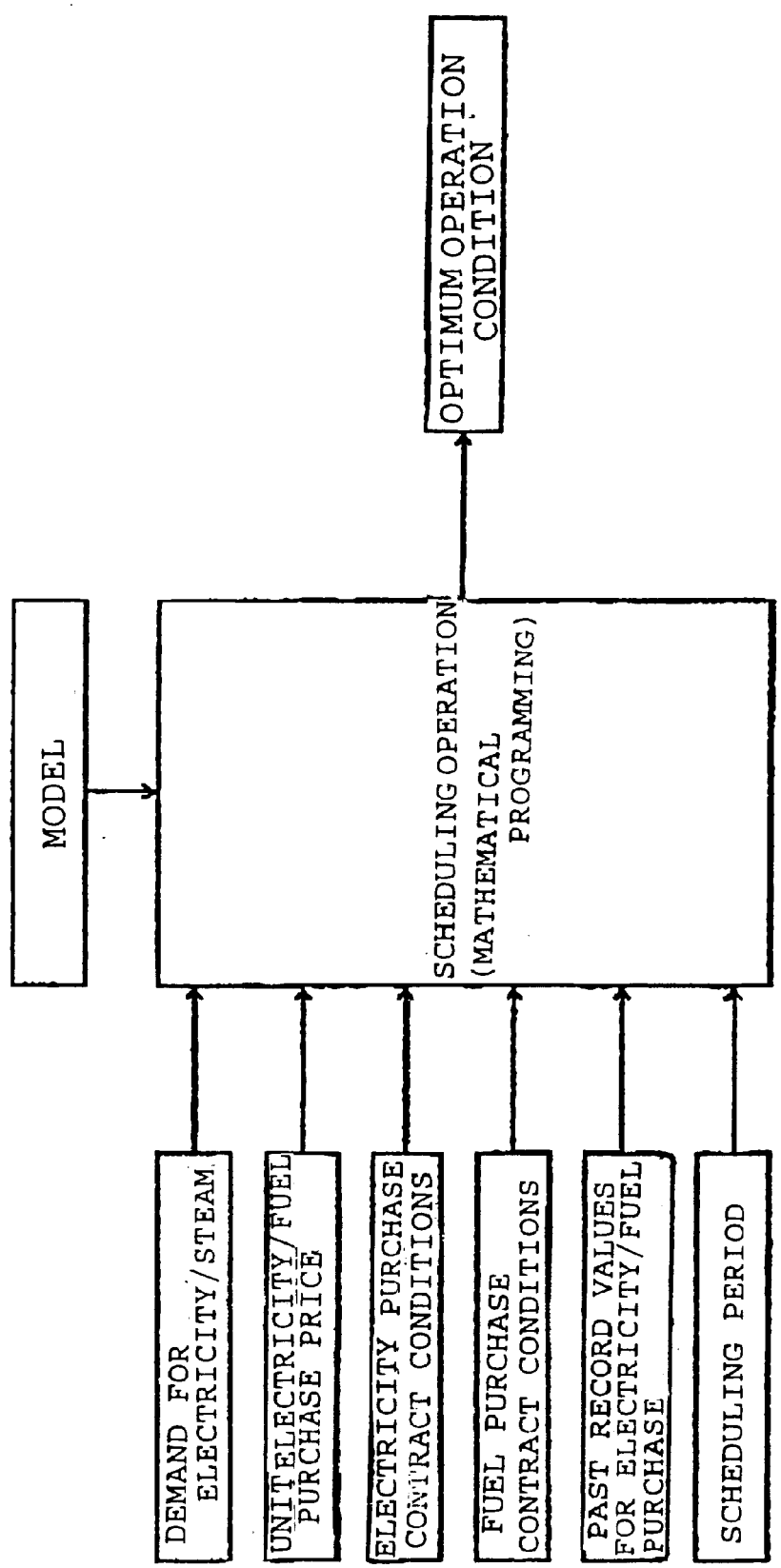
FIG. 7 is a diagram for use in illustration of a schedule operation according to an embodiment.

A scheduling operation according to an embodiment is shown in FIG. 7. More specifically, a scheduling operation by mathematical programming is performed based on the demands for electricity and steam, the unit electricity purchase price, the unit fuel purchase price, electricity purchase contract conditions, fuel purchase contract conditions, and purchase past record values for electricity and fuel on the basis of a specified period such as a day, and the model of the power plant, and an optimum operation schedule for the power plant to minimize the operation cost is thus calculated. At the time, operation/stopping of boilers and turbines should be taken into account, and therefore mixed integer programming is employed as the mathematical programming method.

One such optimally scheduled operation condition is for example the amount of electricity received or the amount of fuel used, and these values in real time are set as a target value in the optimizing system 110.

The respective functions of the scheduling system 130 shown in FIG. 5 are implemented by programs, and some commercially available packaged general purpose software such as GAMS (General Algebraic Modeling System) available from GAMS Development Corporation can be used for implementing the functions.

INDUSTRIAL APPLICABILITY

As in the foregoing, by using the present invention, the operation efficiency of a power plant as a whole can be improved based on constantly changing demands for steam and electricity, regardless of the ability of the operator. Furthermore, future demands for steam and electricity can be taken into account, and the operation efficiency of the power plant as a whole can be improved.

What is claimed is:

1. An optimizing control method, for use in a power plant including a plurality of parallel-operated generating elements supplying electricity and steam, to control the generating elements by using an optimum load distribution while satisfying a balance between demand and supply of the electricity and the steam, said method comprising the steps of:

estimating parameters of characteristics and state of the generating elements, which cannot be directly measured, among parameters of the generating elements needed for calculation of the optimum load distribution for each of the generating elements, based on a physical model of each of the generating elements and an input process state quantity; and controlling each of the generating elements by determining an optimum load distribution for the each of the generating elements while using the estimated parameters of the each of the generating elements, to minimize a total cost of the power plant, wherein the physical model includes steam enthalpies of steam inlet and steam outlet.

2. The optimizing control method for a power plant as defined in claim 1, wherein schedule control data indicating the parameters of the each of the generating elements and factors of fluctuations of running cost of the power plant in specified period are input, a schedule calculation is executed for obtaining a schedule to operate the power plant while minimizing cost in the specified period based on the input schedule control data and a model for the power plant, and the optimum load distribution of the each of the generating elements is calculated depending on the parameters of the each of the generating elements and the input process state quantity based on the obtained schedule.

3. The optimizing control method for a power plant as defined in claim 1, wherein said controlling step of each of the generating elements based on the optimum load distribution and the input process state quantity includes obtaining a control quantity based on a multi-variable model calculation.

4. The optimizing control method for a power plant as defined in claim 1, wherein the parallel-operated generating elements include a plurality of boilers and a plurality of turbines.

5. The optimizing control method for a power plant as defined in claim 4, wherein the physical model of the turbines is a physical model in consideration of pressure loss characteristics which depend on a steam flow rate through a turbine steam control valve.

6. An optimizing control system, for use in a power plant including a plurality of parallel-operated generating elements supplying electricity and steam, for controlling the generating elements by using an optimum load distribution while satisfying a balance between demand and supply of the electricity and the steam, said optimizing control system comprising:

an optimizing system for estimating parameters of characteristics and state of the generating elements, which cannot be directly measured, among parameters of the generating elements needed for calculation of the optimum load distribution for each of the generating elements, based on a physical model of each of the generating elements and an input process state quantity, to determine an optimum load distribution of each of the generating elements which minimizes total cost of the power plant; and a multi-variable control system for obtaining and setting a control quantity of each of the generating elements based on a multi-variable model predictive control using the optimum load distribution determined by said optimizing system and input process quantity, wherein the physical model includes steam enthalpies of steam inlet and steam outlet.

7. The optimizing control system for a power plant as defined in claim 6, wherein said optimizing system includes a scheduling system for inputting schedule control data indicating information of fluctuating factors of running cost of the power plant in a specified period, and executing a schedule calculation for obtaining a schedule to operate the power plant while minimizing the running cost in the specified period based on the input schedule control data and the model for the power plant, and an optimizing operation system for calculating the optimum load distribution of the each of the generating elements depending on the parameters of the each of the generating elements and the input process state quantity based on the schedule obtained by the schedule calculation.

8. The optimizing control system for a power plant as defined in claim 6, wherein said parallel-operated generating elements include a plurality of boilers and a plurality of turbines.

9. The optimizing control system as defined in claim 8, wherein the physical model of the turbines is a physical model in consideration of pressure loss characteristics which depend on a steam flow rate through a turbine steam control valve.

10. The optimizing control method for a power plant as defined in claim 1, wherein the steam enthalpies comprise steam enthalpies at steam inlet and outlet of a steam control valve in the each of the generating elements.

11. The optimizing control system for a power plant as defined in claim 6, wherein the steam enthalpies comprise steam enthalpies at steam inlet and outlet of a steam control valve in the each of the generating elements.

* * * * *